Patented Aug. 18, 1925.

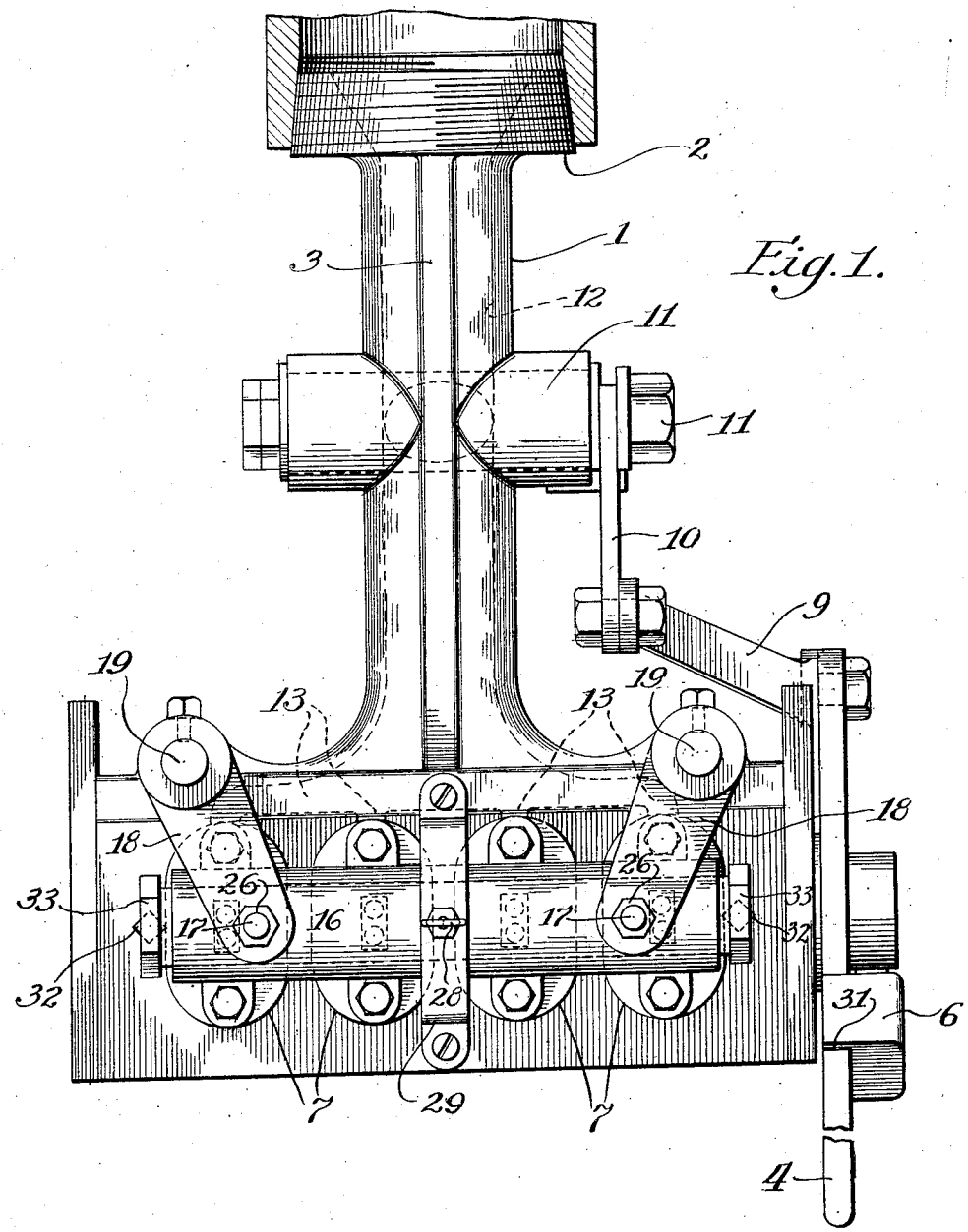

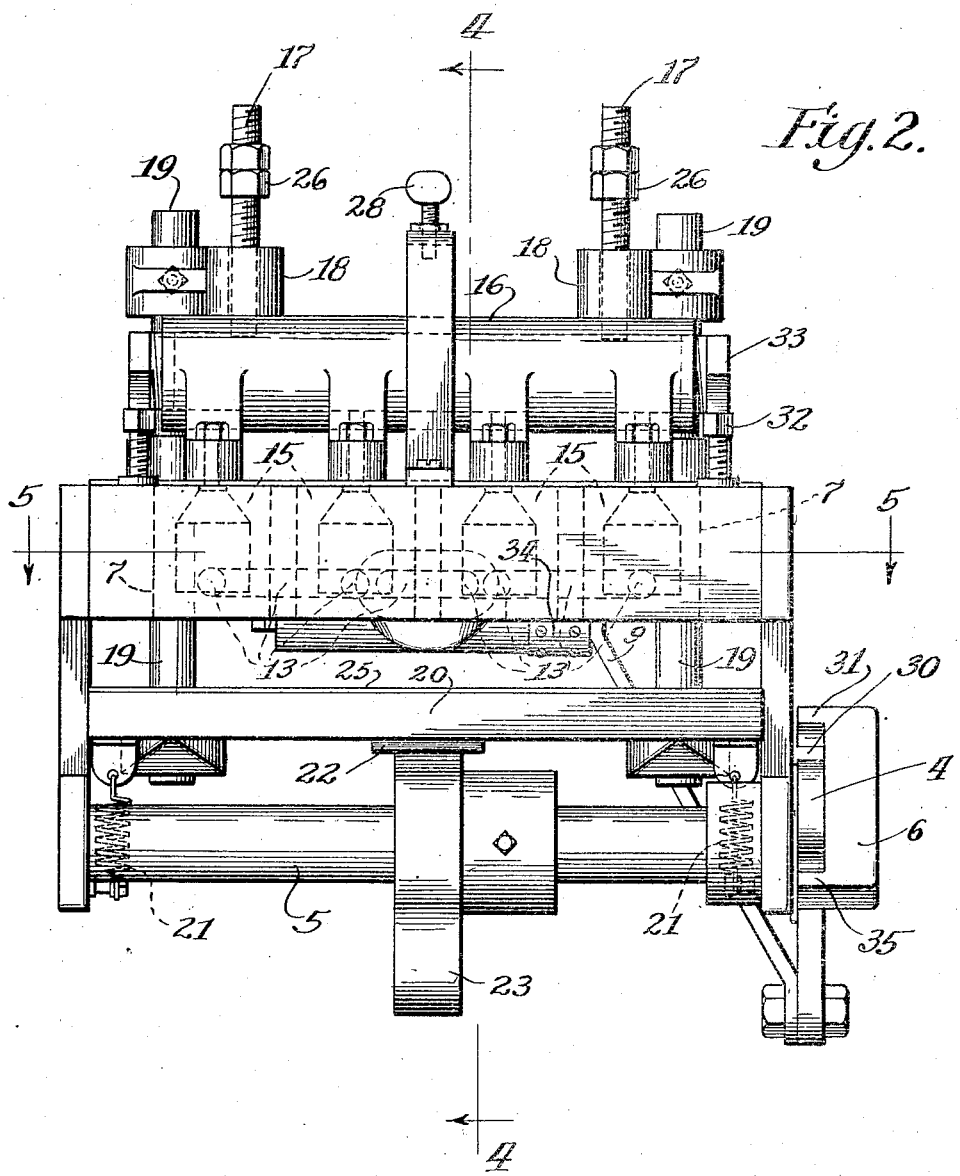

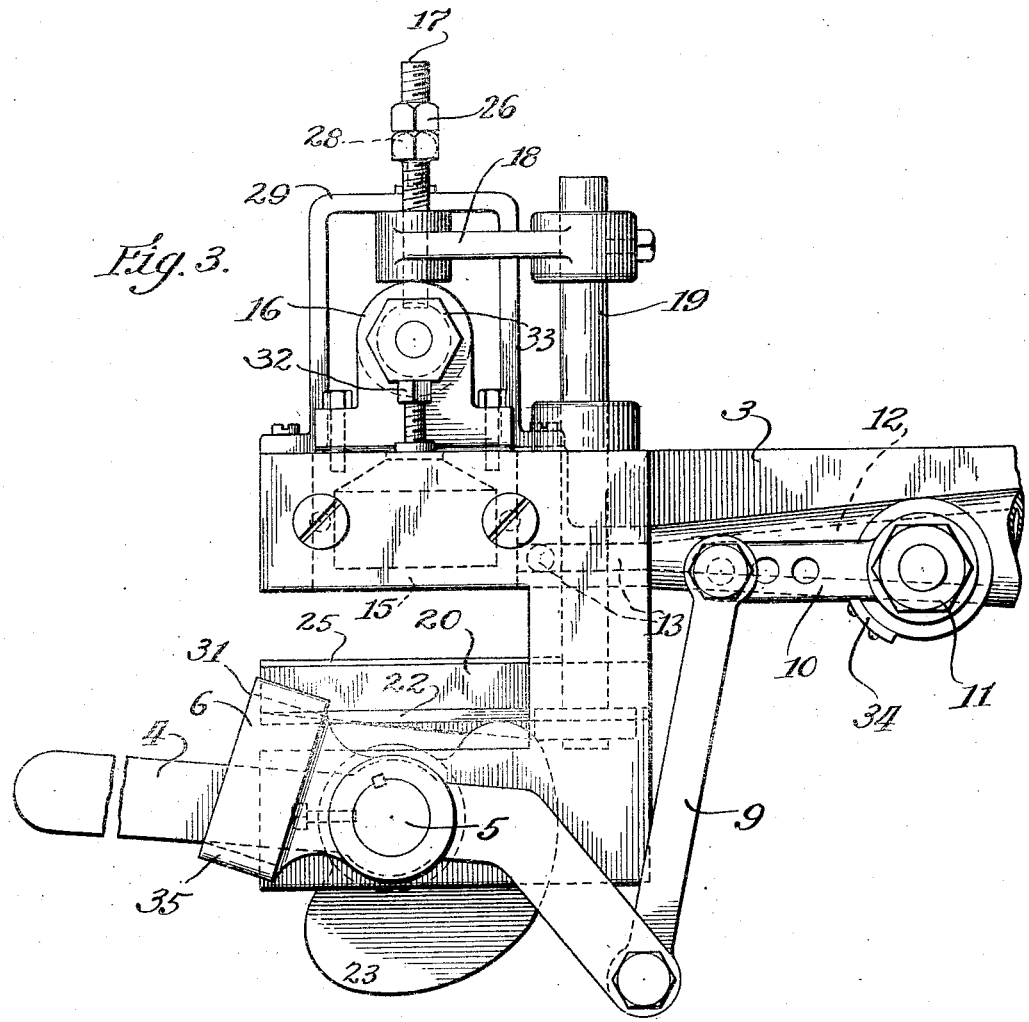

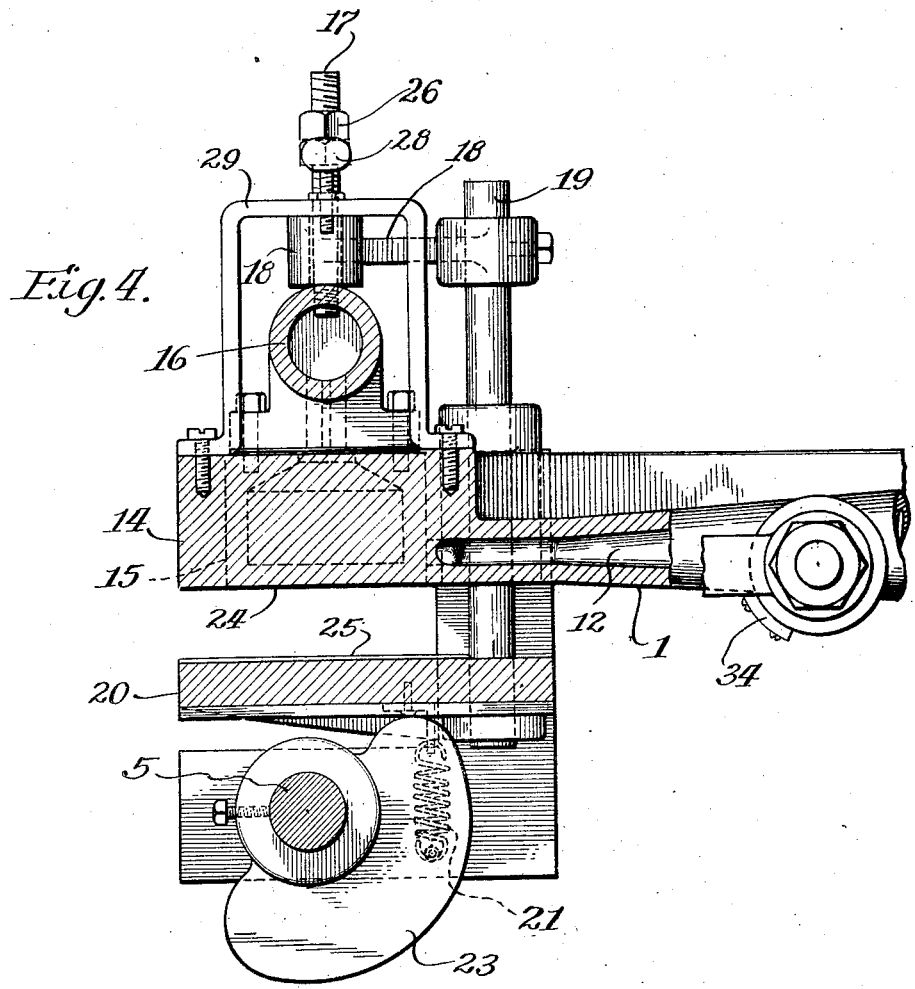

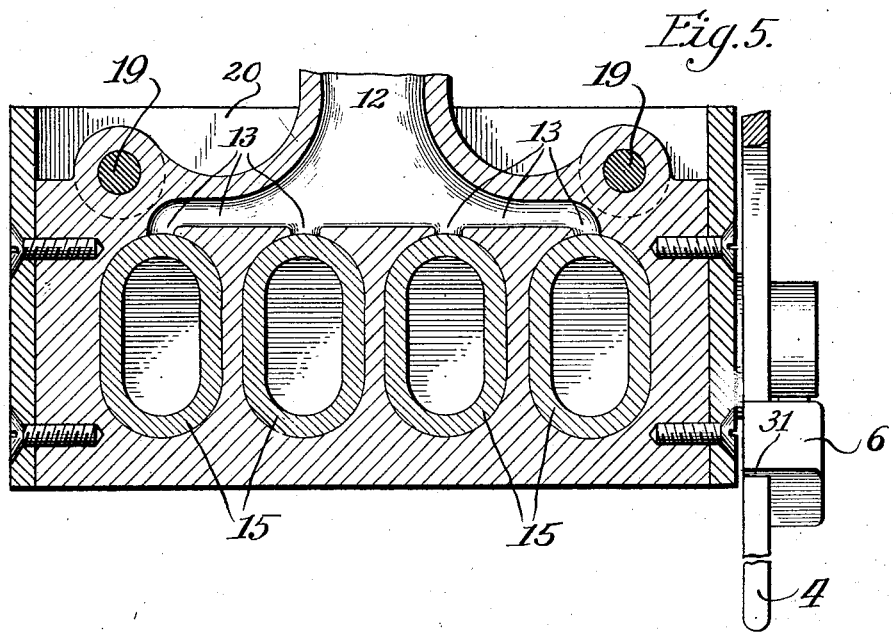
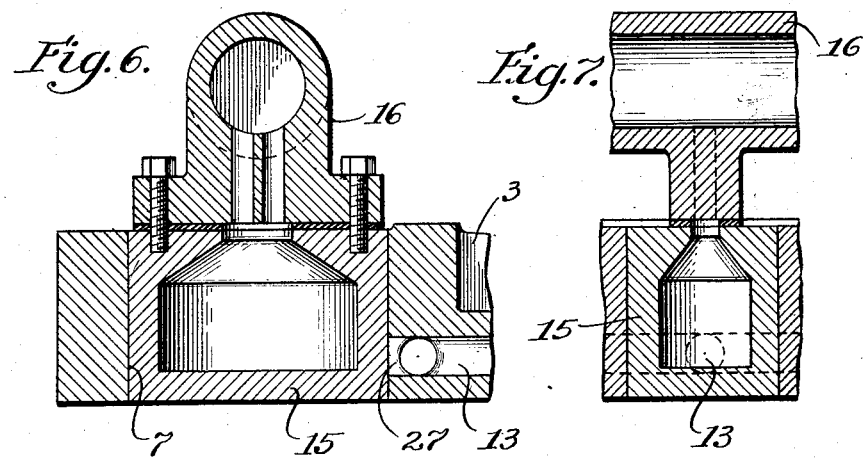

1,550,617

UNITED STATES PATENT OFFICE.

GEORGE J. KELLERMAN, OF CHICAGO, ILLINOIS, ASSIGNOR TO SWIFT & COMPANY, OF CHICAGO, ILLINOIS, A CORPORATION OF ILLINOIS.

MACHINE FOR FORMING SAUSAGE PATTIES.

Application filed November 10, 1924. Serial No. 749,089.

*To all whom it may concern:*

Be it known that I, GEORGE J. KELLERMAN, a citizen of the United States of America, and a resident of Chicago, county of Cook, and State of Illinois, have invented a new and useful Improvement in Machines for Forming Sausage Patties, of which the following is a specification.

The purpose of this invention is to provide a machine for forming and delivering sausage patties in condition for packaging without the necessity of having any of the meat directly handled during the forming or feeding operation, and for delivery of the patties on a sheet of paper so that the patties may be lifted by means of this paper and placed in the packages in which the patties are marketed. It is also among the purposes of this invention to provide a suitable mechanism of this class wherein there is little likelihood of the escape from the machine of the fluid content of the patties during forming and delivering operation and to provide means for preventing the substance operated upon from adhering to the forming dies and delivery plungers.

The preferred embodiment of the invention is shown in the drawings, in which—

Figure 1 is a plan view of the machine.

Fig. 2 is a front view.

Fig. 3 is a side view.

Fig. 4 is a sectional view taken on line 4—4 of Fig. 2.

Fig. 5 is a sectional view taken on the line 5—5 of Fig. 2.

Figs. 6 and 7 are sectional details of the forming dies.

The construction shown is in the form for an attachment to chopped meat feeding devices ordinarily used in connection with link sausage stuffing horns. The present construction may be attached to such feeding means in place of the usual stuffing horn and comprises a horn shaped conduit terminating in a plurality of pattie forming molds and provided with means whereby the pressure of the meat in the horn may be controlled during and after the passage of delivery plungers through the forming dies. A single operating means is provided, arranged for successively allowing and cutting off the pressure of the meat in the horn and operating the delivery plungers. The delivery plungers are made hollow in order to permit the circulation of warm water therethrough. This circulation of warm water serves to keep the mechanism at the required temperature and also prevents the meat and liquid therein from being chilled on and adhering to the metal surface of the forming devices. Suitable means under the action of the operating device is provided for sealing the discharge apertures of the forming molds during the filling operation.

In the drawings, the construction as above outlined comprises a horn 1 which at the receiving end 2 is threaded for attachment to any suitable means for delivering the chopped meat under pressure to the horn. This horn is stiffened by a web 3 to prevent the machine from sagging due to its weight and the downward force exerted thereon through the operating lever 4. This lever, of course, may be operated by mechanical power but as herein shown is a handle suitable for manual operation. The lever 4 is arranged to oscillate around the supporting shaft 5 but passes through a yoke 6, fast to the shaft 5, but allowing a preliminary free return motion of the lever 4 before the shaft is oscillated in order to first interrupt the pressure of the chopped meat in the horn 1 after the forming receptacles 7 have been filled and during operation of the delivery plungers 15. For this purpose the rear end of operating lever 4 is connected by a link 9 to a valve operating arm 10. The valve 11 operated by the arm 10 is located in the passageway 12 of the horn 1. This passageway at the delivery end branches into a plurality of divisions 13 (Fig. 1) each leading to a pattie forming opening 7 in a mold 14.

The forming openings 7 in the mold are preferably elliptical in plan, in order to produce patties of this form. These openings are formed in a transversely extending rigid casting 14, which may be integral with the horn 1, and extend vertically through the casting, providing ways for the vertically reciprocating plungers or dies 15. The latter are hollow, as indicated in Figs. 5, 6 and 7, in order to provide for the circulation of a warming fluid. Each is secured to and communicates with a cross head or manifold 16, also hollow to provide for the circulation of a liquid through the dies. The cross head 16 is provided with a pair of upwardly extending posts 17 (Fig. 2) passing through arms 18 secured to posts 19. The latter are carried by a vertically movable table 20 normally urged downward by springs 21. The table 20 is provided with a wear plate 22 bearing against a cam 23 carried by the shaft 5. When this shaft is rocked to the left (Fig. 4), the cam 23 serves to first rapidly lift the table 20 and then to hold it firmly against the lower surface 24 of the casting 14. The upper surface of the table 20 carries a resilient mat 25 for sealing the discharge apertures of mold 14.

The arms 18 carried by the posts 19, upon the upward motion of table 20, first idly slide along the posts 17 before engaging the nuts 26 along the posts and lift the latter, together with the cross head 16 and dies 15 carried thereby.

Before these dies fully uncover the ports 27 of passageways 13, the table 20 comes into contact with the lower surface 24 of casting 14. The dies 15 are then pushed further upward by the pressure of the substance fed into the molds. The limit of the upward motion of the dies is determined by the setting of screw 28, carried by a yoke 29 secured to casting 14, which screw coacts with the upper surface of the die carrying cross head 16. Upon a reverse oscillation of shaft 5 in the right hand direction (Fig. 4), the table 20 is lowered and the dies or plungers 15 move downwardly under the action of arms 18, bearing against the upper surface of cross head 16; but prior to this reverse operation, the pressure on the substance operated upon is dropped to substantially zero because of the operation of valve 11.

This valve is moved to its closed position upon the preliminary upward movement of the operating handle 4 as it idly passes through the open space 30 in yoke 6 (Fig. 2). Then when the handle 4 engages the upper arm 31 of the yoke 6, shaft 5 is rocked to the right (Fig. 3) permitting the table 20, posts 19 thereon, arms 18, cross head 16 and dies 15 to move down under the action of springs 21 (Fig. 2). The downward limit of movement of table 20 and the parts carried thereby is determined by the setting of screws 32, Fig. 2. These screws coact with hexagonal bushings 33 on the cross head 16; and which bushings serve for connection with flexible conduits through which the warming fluid for the dies passes. The upward limit of the operating handle 4 is determined by the stop 34, Fig. 3, but the shaft 5 is still free to rotate to the right under the action of springs 21 until the lower arm 35 of yoke 6 engages the lower edge of the operating handle.

The operation of the device may be quite rapid, particularly if driven by motor power and if means are provided for rapidly placing on and removing sheets of paper for receiving the patties from the platform 20. Upon each down stroke of the operating handle, the platform 20 moves up, sealing the discharge end of the forming device. Motion is imparted to the platform through the cam 23 on shaft 5, which is rocked to the left, Fig. 3, by operating arm 4 engaging the arm 35 of yoke 6 fast to the shaft. At the same time the arm 4 by its link connection 9 with the valve 11, opens this valve. The table 20 is well under way before the arms 18 carried by the standards 19 on the table, engage nuts 26 and lift the cross head 16 and dies 15 carried thereby. Before the dies have fully uncovered the ports 27 of the meat passageways 13, the discharge end of the molds is sealed by the platform 20. Further upward movement of the dies to the desired extent, as determined by the setting of screw 28, is effected by the pressure of the meat fed into the molds. Then, upon a reverse operation of handle 4, valve 11 is first closed, and then table 20 moves down under the action of springs 21, as permitted by cam 23. The arms 18 finally engage the upper surface of cross head 16, causing the dies 15 to move down to their lowermost position and discharge the patties from the mold onto the paper on platform 20.

Although but one specific embodiment of this invention has been herein shown and described, it will be understood that numerous details of the construction shown may be altered or omitted without departing from the spirit of this invention as defined by the following claims.

I claim:

1. In a machine of the class described, the combination with a hollow forming device of means for feeding material under pressure to said forming device, a plunger arranged to travel in said hollow forming device to alternately permit material to be fed therein and discharge said material therefrom, a discharge outlet in said forming device, and a sealing means for said forming device movable with said plunger, but arranged to have an independent motion during a portion of the stroke.

2. In a machine of the class described, the combination with a hollow forming device of means for feeding material under pressure to said forming device, a plunger arranged to travel in said hollow forming device to alternately permit material to be fed therein and discharge said material therefrom, a discharge outlet in said forming device, a sealing means for said forming device movable with said plunger, a valve in said feeding means for opening and closing communication with said forming device, and means for operating said valve connected for movement with said forming device and sealing means.

3. A machine of the class described, comprising a frame having a forming mold rigid therewith and means for feeding material under pressure to said mold, said mold being open at one end and having a plunger mounted for sliding movement therein, a reciprocating table opposite the open end of said mold adapted for sealing engagement with the mold, means for reciprocating said table comprising an oscillating cam for moving the table in one direction and a spring for moving the table in an opposite direction, a lever for operating said cam, a lost motion connection between said lever and cam, a valve in said feeding means, and a connection between said lever and valve.

4. A machine of the class described, comprising a frame having a forming mold rigid therewith and means for feeding material under pressure to said mold, said mold being open at one end and having a plunger mounted for sliding movement therein, a reciprocating table opposite the open end of said mold adapted for sealing engagement with the mold, means for reciprocating said table comprising an oscillating cam for moving the table in one direction and a spring for moving the table in an opposite direction, a lever for operating said cam, a lost motion connection between said lever and cam, a valve in said feeding means, a connection between said lever and valve, and means carried by said table for reciprocating said plunger.

5. A machine of the class described, comprising a frame having a forming mold rigid therewith and means for feeding material under pressure to said mold, said mold being open at one end and having a plunger mounted for sliding movement therein, a reciprocating table opposite the open end of said mold adapted for sealing engagement with the mold, means for reciprocating said table comprising an oscillating cam for moving the table in one direction and a spring for moving the table in an opposite direction, a lever for operating said cam, a lost motion connection between said lever and cam, a valve in said feeding means, a connection between said lever and valve, and means carried by said table for reciprocating said plunger, said means including a sliding connection with said plunger whereby the table has a preliminary free movement independently of the plunger.

6. A device of the class described, comprising a frame including a rigid mold structure and means for feeding material under pressure to said mold, a plunger mounted for reciprocation in said mold, a port leading from the feeding means to the interior of said mold, said plunger being adapted to cover and uncover said port in its movement in the mold, said mold having an open end, a table for receiving material discharged from the mold, and means for moving said table into sealing position at the discharge end of said mold.

7. A device of the class described, comprising a frame including a rigid mold structure and means for feeding material under pressure to said mold, a plunger mounted for reciprocation in said mold, a port leading from the feeding means to the interior of said mold, said plunger being adapted to cover and uncover said port in its movement in the mold, said mold having an open end, a table for receiving material discharged from the mold, and means for moving said table into sealing position at the discharge end of said mold, a connection between said table and plunger whereby the same may be moved in unison for a portion of the stroke of the table.

8. A machine of the class described, comprising a forming mold, means for feeding material under pressure to said mold, said mold being open at one end, a plunger mounted for sliding movement therein, a reciprocating table opposite the open end of said mold arranged for moving into sealing engagement with the mold, means for reciprocating said table and plunger, a valve in said means for feeding material under pressure to said mold, and a connection for operating said valve in unison with the reciprocation of said table and plunger.

9. A machine of the class described, comprising a forming mold, means for feeding material under pressure to said mold, said mold being open at one end, a plunger mounted for sliding movement therein, a reciprocating table opposite the open end of said mold arranged for moving into sealing engagement with the mold, means for reciprocating said table and plunger, and means for circulating a temperature changing medium through said plunger.

Signed at Chicago this 22 day of Oct. 1924.

GEORGE J. KELLERMAN.